United States Patent Office.

CHARLES P. ORNE, OF CAMBRIDGEPORT, ASSIGNOR TO HIMSELF AND MORRIS F. WHITTON, OF HINGHAM, MASSACHUSETTS.

COMPOSITION FOR WATERPROOFING CLOTH.

SPECIFICATION forming part of Letters Patent No. 242,147, dated May 31, 1881.

Application filed March 25, 1881. (No specimens.)

*To all whom it may concern:*

Be it known that I, CHARLES P. ORNE, of Cambridgeport, of the county of Middlesex and State of Massachusetts, have invented a new and useful Improvement in Compositions for Waterproofing Cloth; and I do hereby declare the same to be described in the following specification.

My invention is designed principally for rendering cotton-duck water-proof and flexible, but is also useful for various other fabrics; and in carrying it out and applying or using it I take seven ounces of tallow and one ounce of caustic soda and boil them in thirty-two ounces of water until they have united and formed a saponaceous solution. To such solution I next add forty-eight ounces of gelatine and thirty-two ounces of glycerine and heat the whole until a thorough combination results. Next, the cloth to be waterproofed is to be dipped in the aforesaid liquid composition or is to have the same thoroughly applied to it by a brush or other suitable means, after which it is to be dried and to be dipped in or have spread upon it a saturated solution of sulphate of alumina and ammonia. This having been done, the cloth is to be dried.

The sulphate of alumina and ammonia unites with the other materials and forms a compound insoluble in water, the glycerine rendering it flexible, and being protected by the other ingredients, so as to be insoluble in water.

I do not confine my composition to the precise proportions of its ingredients, as hereinbefore stated, as such may be somewhat varied and still be productive of the desired result.

What I claim as my invention is—

The waterproofing composition substantially as described, consisting of glycerine, a saponaceous solution, gelatine, and sulphate of alumina and ammonia, combined and for use in manner and for the purpose essentially as set forth.

CHARLES P. ORNE.

Witnesses:
R. H. EDDY,
E. B. PRATT.